United States Patent [19]

Ishizuka

[11] Patent Number: 4,518,334
[45] Date of Patent: May 21, 1985

[54] HIGH TEMPERATURE HIGH PRESSURE APPARATUS

[76] Inventor: Hiroshi Ishizuka, 19-2, Ebara 6-chome, Shinagawa-ku, Tokyo, Japan

[21] Appl. No.: 644,362

[22] Filed: Aug. 27, 1984

[51] Int. Cl.³ .............................................. B30B 11/32
[52] U.S. Cl. ................................ 425/77; 425/DIG. 26
[58] Field of Search ......................... 425/77, DIG. 26

[56] References Cited
U.S. PATENT DOCUMENTS

| | | | |
|---|---|---|---|
| 2,941,246 | 6/1960 | Bundy | 425/77 |
| 2,995,776 | 8/1961 | Giardini et al. | 425/77 |
| 3,137,896 | 6/1964 | Daniels | 425/77 |
| 3,201,828 | 8/1965 | Tryklund | 425/77 |
| 3,423,794 | 1/1969 | Wilson | 425/77 |
| 3,543,347 | 12/1970 | Ishizuka | 425/77 |
| 3,546,413 | 12/1970 | Ishizuka | 425/77 X |
| 3,574,580 | 4/1971 | Stromberg et al. | 425/77 X |
| 3,988,087 | 10/1976 | Ishizuka | 425/77 |
| 4,021,171 | 5/1977 | Shulzhenko et al. | 425/77 |
| 4,097,208 | 6/1978 | Ishizuka | 425/77 |
| 4,385,881 | 5/1983 | Ishizuka | 425/77 |

Primary Examiner—J. Howard Flint, Jr.
Attorney, Agent, or Firm—Larson and Taylor

[57] ABSTRACT

A high temperature high pressure apparatus which comprises: an annular die having a straight cylindrical bore and a substantially conical face in adjacency outwards with each end thereof, a pair of tapered punches which are in opposed and axial alignment with the die so that a conical face of each punch is substantially in parallel with that of the die, a pair of inner gaskets, each of which is made of fired refractory and is arranged in direct abutment on the conical face of the punch and the bore of the die, a pair of outer gaskets, which are made of material of intermediate hardness level and is arranged in adjacency outside the inner gasket, and a pair of stopper rings of readily deformable but highly tough material and arranged in adjacency outwards to the outer gaskets.

6 Claims, 1 Drawing Figure

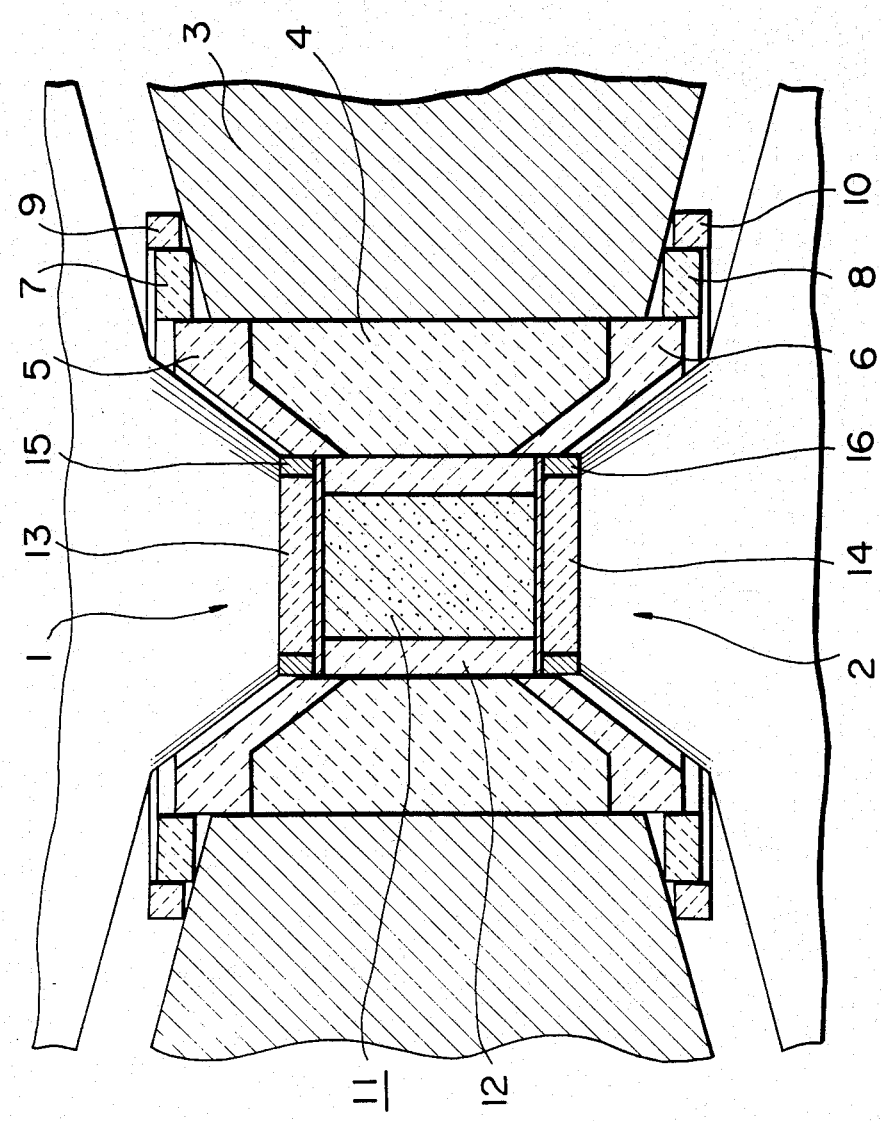

HIGH TEMPERATURE HIGH PRESSURE APPARATUS

The present invention relates to a high temperature high pressure apparatus which basically comprises an annular die and a pair of tapered punches in opposed and axial alignment therewith and, in particular, to such apparatus improved in durability as well as reproducibility of pressures on the order of 60 kilobars simultaneously at temperatures of several hundreds above 1000° C., conditions required for industrial production of synthetic diamond and cubic boron nitride (CBN).

Punch-and-die apparatuses are favored in industrial manufacture of synthetic diamond or CBN for their simplicity in general of construction and a relatively large volume available for specimen to be treated. In designing an apparatus of this type for attaining such high pressures by optimizing the geometry and material of each part, there are two essential points to be considered: first, provision of a special pressure resisting means to every component under severe load, or the punches and die in particular, in order that they can hold effectively a pressure of several tens of kilobars within, which is far beyond the highest strength obtainable with cemented tungsten carbide, the strongest material so far available, and second, confinement of the pressure thus developing within the specimen.

Among known techniques for providing pressure resistance, a high rigidity cylinder is employed which consists of alumina sintered so hard as to exhibit an apparent density very close to the true one, and which is hollow with a space for accomodation of specimen and other reaction parts and arranged in peripheral abutment on a middle cylindrical bore of a die as shown in, for example, U.S. Pat. No. 3,988,087. Examples illustrated therein of the cylinder have at each end a flat surface, perpendicular to the axis and in joint inwards with a conical bore face. The cylinder being shorter than the bore of the die, there is provided a circular space, conveniently referred to as "pocket" hereinafter, which is defined in part by an end cylindrical bore of the die on each flat end face of the high rigidity cylinder. Gaskets of fired agalmatolite are so arranged as being partly accomodated in the pocket and in another space between the punches and high rigidity cylinder. This construction is advantageous in substantially decreased thrust loads on the die bore due to the high rigidity cylinder intervening and properly supported between the specimen and die, and in that punches and die of increased dimensions are successfully realizable with adequate strength due in part to the simplicity especially in contour of the die bore and in part to feasibility of such readily workable material as some hard steel grades, favorable for not requiring powder metallurgy which otherwise would be necessary and essentially limit the mass of such components to be realized as seen in a die of cemented tungsten carbide.

Gaskets are employed in abutting relation with a conical face of punch in most high pressure apparatuses for playing a significant role in securing, as well as a reasonable durability, a good function with punches, die and, occasionally, high rigidity cylinder, such that high pressures should develop within a specimen compressed and densified by advancement of punches, and thus produced pressures should be confined within a given space, that punches should be provided with radial thrust in order to oppose a radial tension deriving from the axial compression which occurs in punches under load during operation, and further importantly, that the high rigidity cylinder should be also compressed to suppress axial elongation in order to secure the reduction of stresses on the die.

Gaskets also have to be so arranged as to provide a proper travel for punch advancement in order to establish a pressure of required levels, prior to heating, for effecting the synthesis of diamond or CBN, and in order to make up for some pressure loss which results from the conversion to respective denser crystal morphology of specimen, especially, and additional plastic deformation of some material between the punches, by further moving the latter in accordance with creeping reduction in volume as the conversion proceeds.

Punch travel is allowed with fired ceramic gaskets principally by axial deformation as they are densified, and in part by material flow to lower pressure regions within or even without the high pressure chamber defined by the punches and die bore. Thus the travel allowance quickly decreases as the compression proceeds prior to the heating.

In a high pressure apparatus with a high rigidity cylinder, gaskets are arranged inside the above said pockets, and provide, based on the high internal friction, a high gradient in which pressure varies, within the high pressure chamber, from over 50 kilobars at an innermost face of gaskets to an atmospheric level at the outermost edge which is open in conventional designs. Thus a principal pressure drop occurs within the gasket portion squeezed between the conical faces of punches and high rigidity cylinder, as this portion confines extreme stresses inside, and a further pressure drop occurs inside another portion within the spaces "pocket", with the final sealing of stresses from the atmosphere and confinement of gasket material from flowing out achieved by the very portion between the punch face and bore edges.

Capability of confinement primarily depends upon and in proportion to the internal friction, effective length (along the surface of contact) and reversely to the thickness of gasket material. Conventionally designed apparatuses have essential difficulty, due to the limited length, in realizing with components of increased dimensions or in providing substantially increased punch travels.

The space "pocket" also provides a receptacle for gasket material as it is compressed and spreads out from between the conical faces of punches and high rigidity cylinder, and produces a mild gradient of pressure within. In order to attain a reasonable extent of service life with conventional apparatuses, where no axial stress support is allowed for the die of steel, it has been desired that the pressure in the "pocket" be limited under 20,000 atms.

Pressure is finally sealed at the bore edges of a die, essentially providing a steepest pressure drop there. Effective punch travels critically depend on the thickness of gaskets at such portion of the die, so there are two simultaneous requirements yet to be sufficiently met with conventionally designed apparatuses: confinement of pressure and an adequate allowance for punch travel in the course of phase conversion.

Japanese Patent Publication Sho 53-34190 discloses an apparatus arrangement in which a gasket in layers of paper, asbestos or the like arranged in adjacency outside another gasket of pyrophyllite which is arranged along the conical faces of an annular die with a straight cylindrical bore.

Although this arrangement may allow rather an increased punch travel, it apparently is disadvantageous in that effective load for compressing the specimen remains low relative to the overall load applied by a hydraulic press, due to more part being spent in compression of the outer and inner gaskets with an increased effective length (along the conical faces of punches and die), an unfavorable feature required for opposing the stronger outward thrust occurring along the inner edge of the outer gasket on this particular die arrangement without any "pocket"

Therefore, one of the principal objects of the present invention is to provide an apparatus, essentially eliminated of above said drawbacks. According to the invention there is provided a high temperature high pressure apparatus which comprises: an annular die having a straight cylindrical bore and a substantially conical face in adjacency outwards with each end thereof, a pair of tapered punches which are in opposed and axial alignment with the die so that a conical face of each punch is substantially in parallel with that of the die, a pair of inner gaskets, each of which is made of fired refractory and is arranged in direct abutment on the conical face of the punch and the bore of the die, a pair of outer gaskets, which are made of material of intermediate hardness level and is arranged in adjacency outside the inner gasket, and a pair of stopper rings of readily deformable but highly tough material and arranged in adjacency outwards with the outer gaskets. A better performance can be achieved with an apparatus characteristically comprising a high rigidity hollow cylinder in abutment on the die bore. So there is also provided another apparatus which comprises: an annular die having a straight cylindrical bore and a substantially conical face in adjacency outwards with each end thereof, a pair of tapered punches which are in opposed and axial alignment with the die so that a conical face of each punch is substantially in parallel with that of the die, a hollow cylinder of high rigidity material, which has a flat face at each end perpendicular to the axis and is in abutment on the bore of the die, a pair of inner gaskets, each of which is made of fired refractory and is arranged in direct abutment on the conical face of the punch, the bore of the die, and the flat face of said hollow cylinder, a pair of outer gaskets, which are made of material of intermediate hardness level and is arranged in adjacency outside the inner gasket, and a pair of stopper rings of readily deformable but highly tough material and arranged in adjacency outwards with the outer gaskets.

In the invention the outer gaskets may consist, singly or in combination, of paper such as cardboard, asbestos, hard rubber or fluorine containing resins such as teflon (trade name) in single block, assembly of smaller pieces, layers or coil, or molded agalmatolite so fired as to exhibit a porosity over 30%.

In this connection, Japanese Patent Publication Sho 53-34190 utilizes cardboard paper as gasket material based on the good pressure resistance; and this instant invention takes most of such property of this particular material or others of similar property, by using in backup support for inner gaskets of ceramic material.

Thus arranged ring-like outer gaskets may take geometry such that the initial ratio, prior to the compression, of radial width to height in perpendicular relation amounts over 1, and favorably between 1 and 3, inclusive, thus permitting secured maintenance of support from outside the inner gaskets, and increased proportion of hydraulic load applied to the compression of specimen, by decreasing the part on the gaskets.

A gap of several millimeters wide (in radial direction) may be allowed between the inner and outer gaskets, although they should be better placed substantially in abutment on the outer and inner periphery, respectively, or occasionally with the outer gaskets resting in contact on or under a flat face of the inner gaskets.

With the outer gaskets of substantially single material intervening, the conical faces in opposition of the punch and die are substantially in parallel, with an occasional outward divergence at an angle of or smaller than 10°, favorably for decreased proportion of press load required for compression of the gaskets due to the pressure continuously decreasing outwards. Such conical faces can be outwards convergent at angles within 10° if the gasket contsists of two or more materials, with a softer material portion outside a harder material portion.

The stopper ring of the invention is substantially made of either a block or a closed loop with the ends joined, of soft rubber, polyethylene, PVC or other tough and hard-to-tear materials which are also softer than the outer gasket. The ring and outer gasket are arranged in abutment immediately or by means of another piece of material of intermediate softness between the outer gasket and ring.

Although applicable in general to a die arrangement comprising the pocket at each end of the bore, the above described system of inner and outer gaskets and stopper ring are most effectively employed on or in a die with a bore straight cylindrical over the length, in combination with a high rigidity hollow cylinder shorter in length than the bore so that said cylinder is in abutment on a middle portion of the die bore. This arrangement permits a secured punch travel for compression to the completion of a conversion run, under secured pressure reduction on the die due to the high rigidity cylinder which lines the die and which is adequately supported by axial load. Improvement in die service life is also achievable as a result of thus secured function of the cylinder in combination with improved stress condition around die edges, which otherwise would be susceptible to cracking.

The merits set forth above can be achieved equally with a die which has a cylindrical bore such that each end portion exhibits a discontinuously increased diameter with a flat face at the joint, as shown in U.S. Pat. No. 4,097,208.

Further features and advantages of the invention will be understood from the following description, taken in connection with the accompanying drawing, in which:

The FIGURE of the drawing shows an elevation in section of a high temperature high pressure apparatus designed according to the invention. In the FIGURE, a pair of punches 1, 2 of cemented tungsten carbide, such as WC-Co, are in opposed and axial alignment with an annular die 3 of steel such as high speed or die grade. In abutment on a straight cylindrical bore of the die there are provided a high rigidity cylinder 4 which consists of alumina ceramic sintered so hard as to be substantially pore-free and which exhibits a trapezoidal cross section with a length shorter than the bore of the die, and an inner gasket 5, 6 of molded and fired chamotte (or, grog) ceramic in adjacency to each end of the cylinder 4. The inner gaskets 5, 6 are surrounded by outer gaskets 7, 8 which consist of cardboard in layered structure. The gaskets 7, 8, in turn, are surrounded by stopper rings 9, 10 which are made of a strip of rubber wound around several times and secured together. The cylinder 4 is lined inwards with a sleeve 12 of refractory such as agalmatolite to define a reaction chamber 11, closed at each end with a tablet 13, 14 of hard fired agalmatolite. Steel rings 15, 16 are arranged outside the tablets for conducting through the punches 1, 2 electric current to heat the reaction chamber 11.

In operation of the apparatus, the chamber 11, inner gaskets 5, 6 and outer gaskets 7, 8 are subjected to compression. The gaskets 5, 6, although fluidized under plastification stay for the most part and densify increasingly within the die bore, as the gaps between the punches and die are effectively sealed with the outer gaskets and stopper rings. The cylinder 4 has a conical face in substantial parallel and opposition to an end conical face of the punch, so the gasket portion between the conical faces seals, at a quickly increasing efficiency, compressive stresses inside and a pressure over 50 kilobars can be reached while the inner and outer gaskets still allow a sufficient compression for further advancement of punches, thus permitting to make up for the pressure loss in the course of conversion process. The die herein shown is less susceptible than conventionally to cracking in the bore face, because it is placed under an axial compression on the shoulder (or in the vicinity of bore edges), which effectively can set off the axial tension deriving from severe radial thrusts working on the bore.

EXAMPLE

The apparatus employed comprised cemented tungsten carbide punches, each tapering at 36° against the axis, with a flat end face 75 mm across, and a high speed steel die with a straight cylindrical bore 175 mm across and 165 mm long. The high rigidity cylinder of substantially pore-free, hard sintered alumina measured 125 mm in length and 75 mm in I.D. (minimun), with a conical face inwardly convergent at 36° against the axis. Inner gaskets of 50% $SiO_2$–50% $Al_2O_3$ (in weight) chamotte ceramic had a contour to be fitly placed in abutment on said cylinder and punches, with a thickness of 11 mm along the conical face of the cylinder. The inner gaskets were enclosed with outer gaskets of cardboard block which measured 175 mm in I.D., 225 mm in O.D. and 12.5 mm in thickness, and were wound in four layers with a strip of 3 mm thick, 12.5 mm wide soft rubber secured at the end by adhesive. The reaction chamber was constructed of a fired agalmatolite sleeve of a 35 mm I.D. and 70 mm length.

With this arrangement, punch travel of as long as 6 mm were achieved at good reproducibility during a conversion process to synthetic diamond from graphite, in comparison with an approximately 3 mm long travel achievable with a die with a bore of comparable diameter but of conventional design without the outer gaskets and stopper rings.

As may have been apparent by the description given above, the apparatus of the invention permits to attain the pressure levels to cause conversion runs from graphite and HBN to diamond and CBN, respectively, with an additional punch advancement allowed in adequate extent for making up for pressure loss occurring in the course of conversion run. Thus with the apparatus, 1. Pressures can be produced, properly controlled until the completion of a conversion process, achievable due to the substantially increased punch travel allowance, so the crystalline product can be obtained with higher and more consistent quality in grain size and morphology, by properly regulating the pressure condition with higher precision at critical moments, which is now achievable successfully;

2. The die exhibits an increased service life, due to the support by axial compression. Further improvement is also obtained due to decreased pressure gradient along the bore and;

3. Improvement is achievable in stress reduction on the die, or efficiency of pressure production inside the high rigidity cylinder, as it is placed under proper support by an adequate axial compression which suppresses axial elongation.

I claim:

1. A high temperature high pressure apparatus which comprises: an annular die having a straight cylindrical bore and a substantially conical face in adjacency outwards with each end thereof, a pair of tapered punches which are in opposed and axial alignment with the die so that a conical face of each punch is substantially in parallel with that of the die, a pair of inner gaskets, each of which is made of fired refractory and is arranged in direct abutment on the conical face of the punch and the bore of the die, a pair of outer gaskets, which are made of material of intermediate hardness level and is arranged in adjacency outside the inner gasket, and a pair of stopper rings of readily deformable but highly tough material and arranged in adjacency outwards to the outer gaskets.

2. An apparatus as recited in claim 1, in which said outer gaskets substantially consist of at least one material selected from fired agalmatolite, paper, asbestos, hard rubber, and fluorine containing resin.

3. An apparatus as recited in claim 1, in which said stopper ring substantially consists of at least one material selected from soft rubber, polyethylene, and polyvinylchloride (PVC).

4. A high temperature high pressure apparatus which comprises: an annular die having a straight cylindrical bore and a substantially conical face in adjacency outwards with each end thereof, a pair of tapered punches which are in opposed and axial alignment with the die so that a conical face of each punch is substantially in parallel with that of the die, a hollow cylinder of high rigidity material, which has a flat face at each end perpendicular to the axis and is in abutment on the bore of the die, a pair of inner gaskets, each of which is made of fired refractory and is arranged in direct abutment on the conical face of the punch, the bore of the die, and the flat face of said hollow cylinder, a pair of outer gaskets, which are made of material of intermediate hardness level and is arranged in adjacency outside the inner gasket, and a pair of stopper rings of readily deformable but highly tough material and arranged in adjacency outwards with the outer gaskets.

5. An apparatus as recited in claim 4, in which said hollow cylinder has, in adjacency inwards with each flat face, a substantially conical face tapering at angles close to that of the punch in opposition and arranged in abutting relation on the inner gasket.

6. A high temperature high pressure apparatus which comprises: an annular die having a first straight cylindrical bore of a smaller diameter and a second straight cylindrical bore of a larger diameter at each end of the first bore with a flat face at the joint of bores, and a substantially conical face in adjacency outwards with each end of the second bore, a pair of tapered punches which are in opposed and axial alignment with the die so that a conical face of each punch is substantially in parallel with that of the die, a hollow cylinder of high rigidity material, which has a flat face at each end perpendicular to the axis and is in abutment on the first bore of the die, a pair of inner gaskets, each of which is made of fired refractory and is arranged in direct abutment on the conical face of the punch, the second bore of the die, and the flat faces of said die and hollow cylinder, a pair of outer gaskets, which are made of material of intermediate hardness level and is arranged in adjacency outside the inner gaskets, and a pair of stopper rings of readily deformable but highly tough material and arranged in adjacency outwards with the outer gaskets.

* * * * *

UNITED STATES PATENT AND TRADEMARK OFFICE
CERTIFICATE OF CORRECTION

PATENT NO. : 4,518,334

DATED : May 21, 1985

INVENTOR(S) : ISHIZUKA, Hiroshi

It is certified that error appears in the above-identified patent and that said Letters Patent is hereby corrected as shown below:

Title page, left hand column, add:

--[30]  Foreign Application Priority Data

Sept 14, 1983 [JP] Japan . . . . . 58-170,025--

Signed and Sealed this

Twenty-fourth Day of September 1985

[SEAL]

Attest:

DONALD J. QUIGG

Attesting Officer

Commissioner of Patents and Trademarks—Designate